US007854780B2

(12) United States Patent
Hirsch

(10) Patent No.: US 7,854,780 B2
(45) Date of Patent: Dec. 21, 2010

(54) VELOCITY-STACK AIR-FILTER ASSEMBLY

(76) Inventor: William Hirsch, 27216 Bonnie Ave., Warren, MI (US) 48093

( * ) Notice: Subject to any disclaimer, the term of this patent is extended or adjusted under 35 U.S.C. 154(b) by 348 days.

(21) Appl. No.: 12/075,534

(22) Filed: Mar. 12, 2008

(65) Prior Publication Data

US 2009/0229232 A1 Sep. 17, 2009

(51) Int. Cl.
*B01D 46/24* (2006.01)
*F02M 9/06* (2006.01)

(52) U.S. Cl. .................. 55/385.3; 55/502; 55/504; 55/505; 55/DIG. 28; 123/41.22; 123/184.53; 123/198 E

(58) Field of Classification Search ............... 55/385.3, 55/336, 491, DIG. 28, 511, 495, 502, 356, 55/467, 471, 472, 505, 504; 123/198 E, 184.53, 123/41.22; 181/227, 228, 230; 220/88.1; 431/346; 48/192
See application file for complete search history.

(56) References Cited

U.S. PATENT DOCUMENTS

| 4,039,308 | A | * | 8/1977 | Schiff | 55/505 |
| 4,066,720 | A | * | 1/1978 | Carter | 261/44.3 |
| 5,868,808 | A | | 2/1999 | Henderson | |
| 6,824,583 | B2 | | 11/2004 | Bulger | |
| D587,187 | S | * | 2/2009 | Moran | D12/400 |
| 2003/0159413 | A1 | * | 8/2003 | Bulger | 55/385.3 |
| 2006/0288673 | A1 | * | 12/2006 | Wimmer | 55/385.3 |
| 2007/0095323 | A1 | * | 5/2007 | Salvisberg | 123/184.53 |

* cited by examiner

*Primary Examiner*—Duane Smith
*Assistant Examiner*—Minh-Chau Pham
(74) *Attorney, Agent, or Firm*—Bliss McGlynn, P.C.

(57) ABSTRACT

An air-filter assembly is adapted to be used with a velocity stack of a carburetor of an internal-combustion engine of an automobile. The air-filter assembly includes a generally hollow air-filter member defining an open face, a closed face, and a side connected to and extending between the open and closed faces of the air-filter member. The closed face and side define an air-inlet end, an air-discharge end disposed opposite the air-inlet end, and an air filter arranged between the air-inlet and air-discharge ends. The air-inlet end is adapted to permit air to flow therethrough from exterior the air-filter assembly. The air filter is adapted to remove impurities entrained in the airflow and permit the filtered air to flow therethrough. The air-discharge end is adapted to permit the filtered air to flow therethrough into the velocity stack. A retaining ring member is mounted about the open face and at least a portion of the side of the air-filter member and adapted to be manually mounted about a lip of an outer open end of the velocity stack to lock the air-filter assembly to the velocity stack.

14 Claims, 2 Drawing Sheets

VELOCITY-STACK AIR-FILTER ASSEMBLY

BACKGROUND OF THE INVENTION

1. Field of the Invention

The invention relates, generally, to an air filter and, more particularly, to an air-filter assembly adapted to be used with a velocity stack of a carburetor of an internal-combustion engine of an automobile.

2. Description of the Related Art

It is known to try to improve performance of an internal-combustion engine of an automobile by increasing the volume (or maximizing efficiency of moving a desired volume) of an air-fuel mixture being delivered to a combustion chamber (or combustion chambers) of the engine by applying at least one air-intake velocity stack to an air-intake side of a carburetor of the engine. Such performance is improved when each velocity stack is properly shaped and sized relative to a respective area of a throat of the carburetor so that resulting air flow is maximized. The velocity stack can operate with an air filter mounted thereon. Filtration of air entering the velocity stack minimizes the amount and kind of or even prevents impurities from ultimately entering the engine.

More specifically, by adapting the shape of the velocity stack and the diameter of a throat thereof to provide for proper air flow into the carburetor, the desired volume of the air-fuel mixture ultimately moves into the chamber of the engine. To this end, the velocity stack may include an upper mouth section and a lower throat section integrally extending operatively downward from the mouth section. In operation, the mouth section is generally upside-down-bell- or V-shaped and defines an outer open end thereof designed to receive the filtered airflow directly from the air filter. The outer open end also defines a generally cross-sectionally linear (triangular) or arcuate lip designed to be mounted to the air filter such that the air filter and velocity stack can be assembled to each other. The throat section is generally cylindrical or funnel-shaped and defines the throat and an inner open end thereof designed to pass the filtered airflow directly to the carburetor. The inner open end is designed to also be mounted to the carburetor such that the velocity stack and carburetor can be assembled to each other.

By way of example only, the carburetor may employ a mounting plate used to mount the carburetor to the inner open end of the throat section of the velocity stack. The carburetor, in turn, is coupled to the engine through use of a mounting fixture. An internal throat of the mounting fixture is generally aligned with the throat section of the velocity stack to provide a consistent flow path of the filtered air from the velocity stack to the carburetor and the air-fuel mixture from the carburetor to the engine when a throttling mechanism is opened. In this way, a proper balance is provided between the shape and size of the velocity stack and the shape and size of the internal throat to achieve the desired volume of the air-fuel mixture at an adequate flow thereof (or maximum efficiency of moving the desired volume of the air-fuel mixture) being delivered to the combustion chamber (or combustion chambers) of the engine.

It should be appreciated by those having ordinary skill in the related art that each of the velocity stack, carburetor (and attendant mounting plate and fixture), and engine can be constructed in any suitable way and operate in any suitable manner and forms no part of the invention. It should be so appreciated also that the velocity stack, carburetor (and attendant mounting plate and fixture), and engine can have any suitable structural relationship with each other without departing from the structure and function of the invention. It should be so appreciated also that each of the throat of the carburetor, throat section of the velocity stack, and internal throat of the mounting fixture can have any suitable shape, size, and structure and structural relationship with the others without departing from the structure and function of the invention.

The known air filter is designed to, as already noted, minimize the amount and kind of or even prevent the impurities—such as dirt, dust, pebbles, or other particular contaminants—from entering the velocity stack and, thus, carburetor and engine during operation of the automobile. Otherwise, a quantity of the impurities may be sucked into the velocity stack sufficient to result in damage to or destruction of a component or components of the carburetor and/or engine or even a shutdown of functioning of the automobile. To this end, many air filters include a light, aluminum mesh screen.

However, the known air filter detracts from appearance of the velocity stack—especially if the velocity stack has been, say, highly chromed—and proper functioning of the velocity stack. In particular, the known air filter defines a high profile thereof and, thus, takes visible attention away from the velocity stack and/or requires a proportionately lower profile of the velocity stack such that the combination of the air filter and velocity stack can be properly fitted and functional under the hood of the automobile. The known air filter also operatively provides non-optimal airflow therethrough. In particular, structure of particular elements of the known air filter over which air flows is not designed to maximize efficiency—volume, speed, and/or direction—of such flow. The known air filter operatively also requires a tool or tools to mount the air filter to the velocity stack such that greater time, money, and effort are necessary to assemble the air filter and velocity stack to each other. The known air filter operatively requires also periodic oiling thereof such that greater time, money, and effort are necessary to maintain it. The known air filter operatively also is flimsy and, thus, creates more vibration and, in turn, noise thereof. The known air filter operatively is also corrosive and, thus, lasts a shorter period of time.

Thus, there is a need for an air filter that is adapted to be used with a velocity stack of a carburetor of an internal-combustion engine of an automobile. There is a need for such an air filter that does not detract from appearance and proper functioning of the velocity stack. There is a need for such an air filter that also operatively provides optimal airflow therethrough. There is a need for such an air filter that operatively also does not require any tools to mount the air filter to the velocity stack. There is a need for such an air filter that operatively does not require also periodic oiling thereof. There is a need for such an air filter that operatively also is not flimsy. There is a need for such an air filter that operatively is not also corrosive.

SUMMARY OF THE INVENTION

The invention overcomes the disadvantages in the related art in an air-filter assembly adapted to be used with a velocity stack of a carburetor of an internal-combustion engine of an automobile. The air-filter assembly includes a generally hollow air-filter member defining an open face, a closed face, and a side connected to and extending between the open and closed faces of the air-filter member. The closed face and side define an air-inlet end, an air-discharge end disposed opposite the air-inlet end, and an air filter arranged between the air-inlet and air-discharge ends. The air-inlet end is adapted to permit air to flow therethrough from exterior the air-filter assembly. The air filter is adapted to remove impurities entrained in the airflow and permit the filtered air to flow therethrough. The air-discharge end is adapted to permit the filtered air to flow therethrough into the velocity stack. In one embodiment of the air-filter assembly, a retaining ring member is mounted about the open face and at least a portion of the side of the air-filter member and defines an interior side and an interior space of the retaining ring member. The interior side defines a generally jagged indentation with respect to the interior space adapted to manually mountingly receive a lip of an outer open end of the velocity stack to lock the air-filter assembly to the velocity stack. In another embodiment of the air-filter assembly, the retaining ring member is mounted about the open face and at least a portion of the side of the air-filter member, adapted to be manually mounted about a lip of an outer open end of the velocity stack to lock the air-filter assembly to the velocity stack, and defines an exterior side, an interior side, a top side, and a bottom side of the retaining ring member. Intersection of the interior and top sides with each other forms a generally arcuate corner. In another embodiment of the air-filter assembly, the retaining ring member is mounted about the open face and at least a portion of the side of the air-filter member and defines an interior side and an interior space of the retaining ring member. The interior side is generally concave with respect to the interior space and adapted to manually mountingly receive a lip of an outer open end of the velocity stack to lock the air-filter assembly to the velocity stack.

One object, feature, and/or advantage of the air-filter assembly of the invention is that it is adapted to be used with a velocity stack of a carburetor of an internal-combustion engine of an automobile.

Another object, feature, and/or advantage of the air-filter assembly of the invention is that use thereof minimizes the amount and kind of or even prevents impurities from ultimately entering the engine.

Another object, feature, and/or advantage of the air-filter assembly of the invention is that use thereof improves performance of the engine.

Another object, feature, and/or advantage of the air-filter assembly of the invention is that use thereof does not detract from appearance and proper functioning of the velocity stack.

Another object, feature, and/or advantage of the air-filter assembly of the invention is that it defines a low profile thereof.

Another object, feature, and/or advantage of the air-filter assembly of the invention is that use thereof does not take away visible attention from the velocity stack.

Another object, feature, and/or advantage of the air-filter assembly of the invention is that use thereof does not require a proportionately lower profile of the velocity stack such that the combination of the air-filter assembly and velocity stack can be properly fitted and functional under the hood of the automobile.

Another object, feature, and/or advantage of the air-filter assembly of the invention is that use thereof provides optimal airflow therethrough.

Another object, feature, and/or advantage of the air-filter assembly of the invention is that structure of particular elements thereof over which air flows is designed to maximize efficiency—volume, speed, and/or direction—of such flow.

Another object, feature, and/or advantage of the air-filter assembly of the invention is that use thereof does not require any tools to mount the air-filter assembly to the velocity stack.

Another object, feature, and/or advantage of the air-filter assembly of the invention is that less time, money, and effort are necessary to assemble the air-filter assembly and velocity stack to each other.

Another object, feature, and/or advantage of the air-filter assembly of the invention is that it is made of stainless steel and silicone.

Another object, feature, and/or advantage of the air-filter assembly of the invention is that use thereof does not require periodic oiling thereof.

Another object, feature, and/or advantage of the air-filter assembly of the invention is that less time, money, and effort are necessary to operatively maintain it.

Another object, feature, and/or advantage of the air-filter assembly of the invention is that it can be easily, quickly, and safely removed for cleaning and/or replacement thereof.

Another object, feature, and/or advantage of the air-filter assembly of the invention is that it is operatively rigid.

Another object, feature, and/or advantage of the air-filter assembly of the invention is that use thereof creates less vibration and, in turn, noise thereof.

Another object, feature, and/or advantage of the air-filter assembly of the invention is that it is operatively non-corrosive.

Another object, feature, and/or advantage of the air-filter assembly of the invention is that it operatively lasts a longer period of time.

Another object, feature, and/or advantage of the air-filter assembly of the invention is that it is adapted to be lip-locked to the velocity stack.

Another object, feature, and/or advantage of the air-filter assembly of the invention is that it is economical and simple to produce.

Other objects, features, and advantages of the air-filter assembly of the invention will be readily appreciated as it becomes more understood while reading the subsequent description of the air-filter assembly taken in conjunction with the accompanying six figures.

BRIEF DESCRIPTION OF EACH FIGURE OF THE DRAWING

DETAILED DESCRIPTION OF EMBODIMENTS OF THE INVENTION

Referring now to the figures generally, where like numerals are used to designate like structure, an air-filter assembly of the invention is generally indicated at 10. The air-filter assembly 10 is described below and shown in the figures employed with a velocity stack, generally indicated at 12, of a carburetor, generally indicated at 14, of an internal-combustion engine (not shown) of an automobile (not shown). It should be appreciated by those having ordinary skill in the related art that the structure of each of the velocity stack 12 and carburetor 14 and the structural relationship thereof with the other disclosed herein are exemplary only and the air-filter-assembly 10 is not limited to use therewith. It should be so appreciated also that the air-filter assembly 10 can be employed with any suitable velocity stack, in particular, and combination of a velocity stack, carburetor, and engine, in general.

Figure 1:
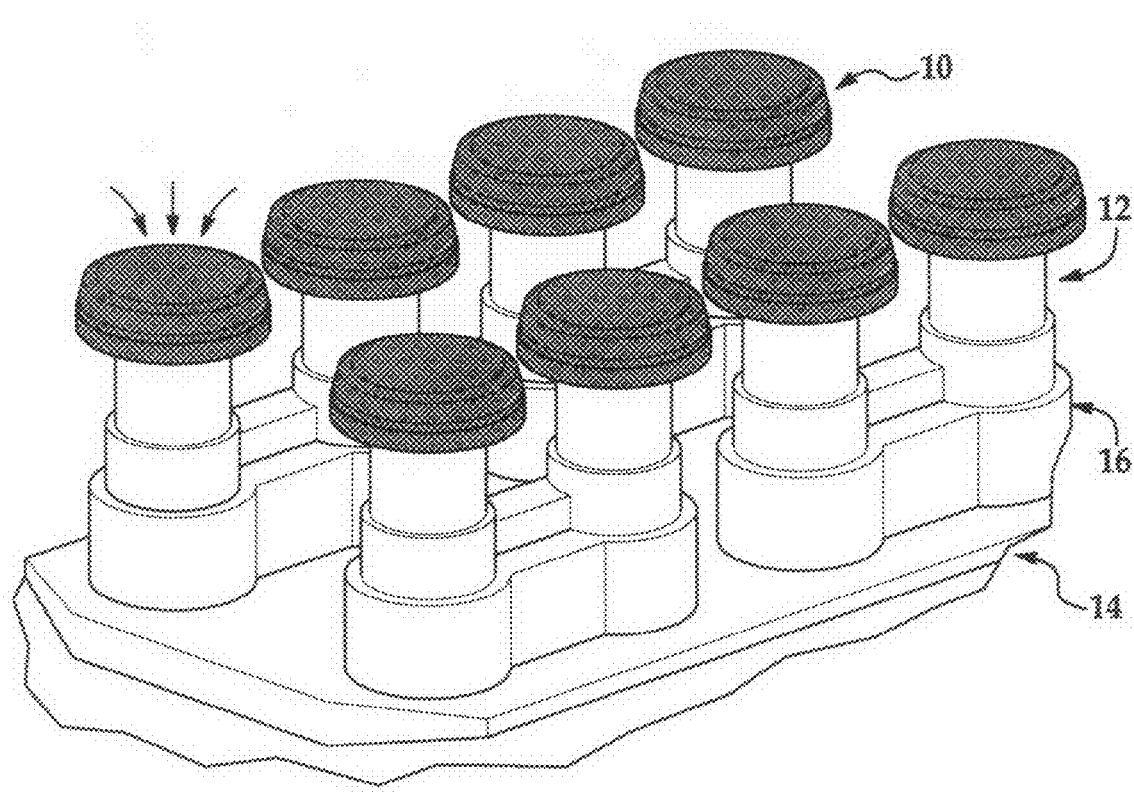
FIG. 1 is an environmental view of a plurality of air-filter assemblies of the invention attached to respective velocity stacks of a carburetor of an internal-combustion engine of an automobile.
Figure 2A:
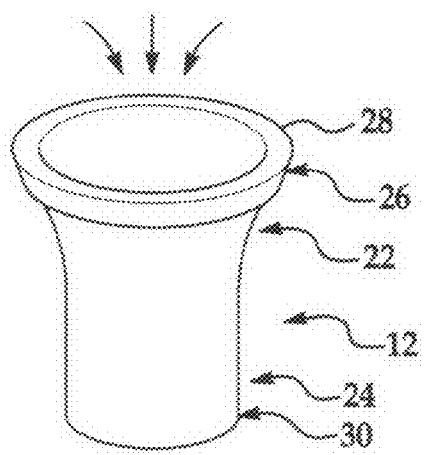
FIG. 2A is a perspective view of one of the velocity stacks shown in FIG. 1 and that defines a cross-sectionally linear (triangular) lip thereof onto which first and second embodiments of an air-filter assembly of the invention illustrated in FIGS. 3 and 4, respectively, are adapted to be mounted.
Figure 2B:
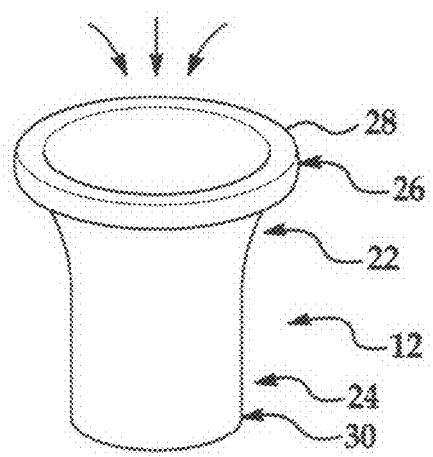
FIG. 2B is a perspective view of one of the velocity stacks shown in FIG. 1 and that defines a cross-sectionally arcuate lip thereof onto which a third embodiment of an air-filter assembly of the invention illustrated in FIG. 5 is adapted to be mounted.

Referring now to FIGS. 1, 2A, and 2B specifically, the velocity stack 12 includes an upper mouth section, generally indicated at 22, and a lower throat section, generally indicated at 24, integrally extending downward from the mouth section 22. The mouth section 22 is generally upside-down-bell- or V-shaped and defines an outer open end, generally indicated at 26, of the mouth section 22 designed to receive filtered airflow directly from the air-filter assembly 10. (Arrows show direction of the airflow.) The outer open end 26 also defines a generally cross-sectionally linear (triangular) (FIG. 2A) or arcuate (FIG. 2B) lip 28 designed to be mounted to the air-filter assembly 10 such that the air-filter assembly 10 and velocity stack 12 can be assembled to each other. The throat section 24 is generally cylindrical or funnel-shaped and defines an inner open end, generally indicated at 30, of the throat section 24 designed to pass the filtered airflow directly to the carburetor 14. The inner open end 30 is designed to also be mounted to the carburetor 14 such that the velocity stack 12 and carburetor 14 can be assembled to each other.

Referring now to FIG. 1, the carburetor 14 employs a mounting plate, generally indicated at 16, used to mount the carburetor 14 to the inner open end 30 of the throat section 24 of the velocity stack 12. The carburetor 14, in turn, is coupled to the engine through use of a mounting fixture (not shown).

Figure 3:
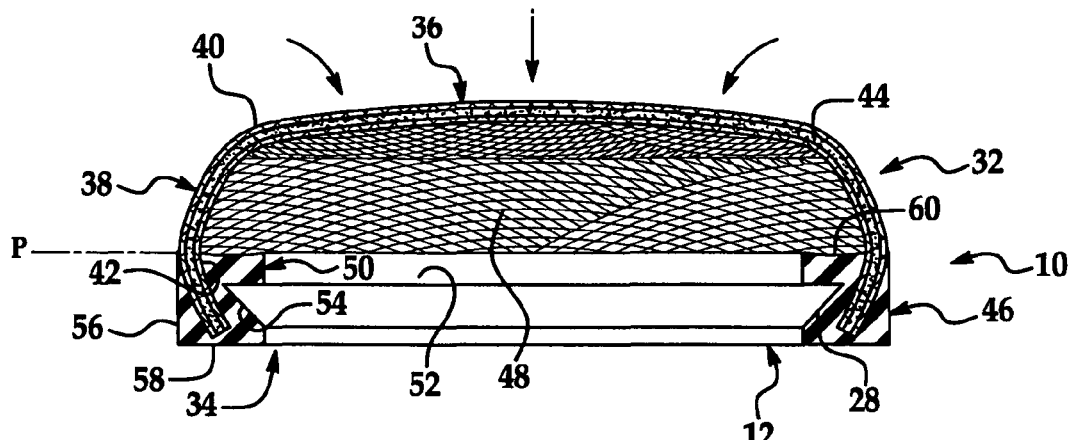
FIG. 3 is a sectional side view of a first embodiment of an air-filter assembly of the invention adapted to be mounted to the type of velocity stack shown in FIG. 2A.
Figure 4:
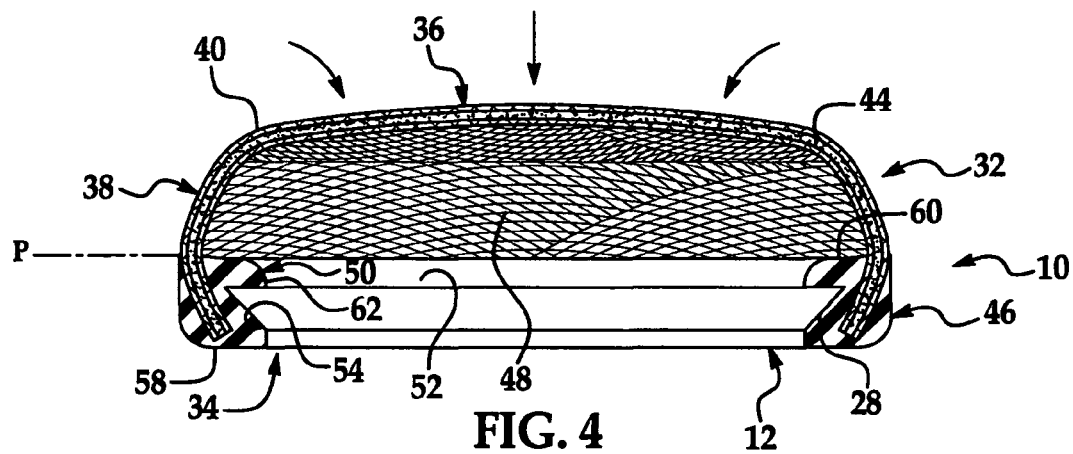
FIG. 4 is a sectional side view of a second embodiment of an air-filter assembly of the invention adapted to be mounted to the type of velocity stack shown in FIG. 2A.
Figure 5:
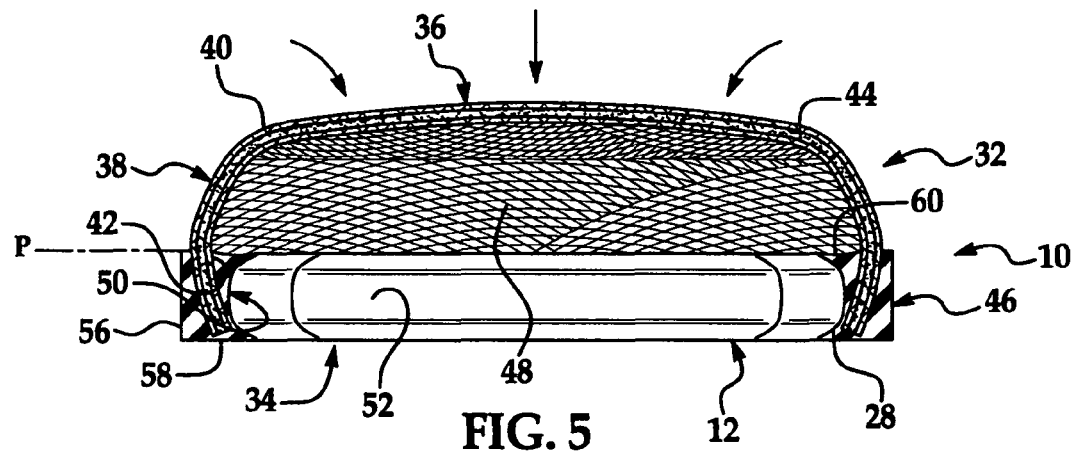
FIG. 5 is a sectional side view of a third embodiment of an air-filter assembly of the invention adapted to be mounted to the type of velocity stack shown in FIG. 2B.

Referring now to FIGS. 3 through 5, the air-filter assembly 10 includes, in general, a generally hollow air-filter member, generally indicated at 32, defining an open face, generally indicated at 34, a closed face, generally indicated at 36, and a side, generally indicated at 38, connected to and extending between the open face 34 and closed face 36 of the air-filter member 32. The closed face 36 and side 38 define an air-inlet end 40, an air-discharge end 42 disposed opposite the air-inlet end 40, and an air filter 44 arranged between the air-inlet end 40 and air-discharge end 42. The air-inlet end 40 is adapted to permit air to flow therethrough from exterior the air-filter assembly 10. The air filter 44 is adapted to remove impurities—such as dirt, dust, pebbles, or other particular contaminants—(not shown) entrained in the airflow and permit the filtered air to flow therethrough. The air-discharge end 42 is adapted to permit the filtered air to flow therethrough into the velocity stack 12. A retaining ring member, generally indicated at 46, is mounted about the open face 34 and at least a portion of the side 38 of the air-filter member 32 and adapted to be manually mounted about the lip 28 of the velocity stack 12 to lock the air-filter assembly 10 to the velocity stack 12.

More specifically and still referring to FIGS. 3 through 5, the air-filter member 32 is generally circular and cross-sectionally dome-shaped. In this way, the air-filter member 32 maximizes efficiency of moving a desired volume of air through the air-filter member 32 to provide optimal airflow through the air-filter assembly 10. The air-inlet end 40, air-discharge end 42, and air filter 44 are arranged as three respective layers in which adjacent layers are completely in contacting relationship with each other. The air-filter member 32 also defines an interior space 48 of the air-filter member 32. The side 38 of the air-filter member 32 is generally concave with respect to the interior space 48. The retaining ring member 46 is integrally mounted about the side 38 and open face 34 of the air-filter member 32 such that a portion of the side 38 extends into the top of the retaining ring member 46 and through at least a portion the retaining ring member 46 downward and inward. (As shown in these figures, the air-filter member 32 does not extend completely through the retaining ring member 46.) However, those having ordinary skill in the related art should appreciate that the air-filter member 32 can have any suitable shape, size, and structure and structural relationship with the retaining ring member 46.

The retaining ring member 46 is generally ring-shaped and defines an interior side, generally indicated at 50, and an interior space 52 of the retaining ring member 46. In one embodiment of the air-filter assembly 10 and as shown in FIGS. 3 and 4, the interior side 50 defines a generally jagged indentation 54 with respect to the interior space 52 adapted to manually mountingly receive the linear (triangular) lip 28 of the velocity stack 12 to lock the air-filter assembly 10 to the velocity stack 12. In another such embodiment and as shown in FIG. 5, the interior side 50 is generally concave with respect to the interior space 52 and adapted to manually mountingly receive the arcuate lip 28 of the velocity stack 12 to lock the air-filter assembly 10 to the velocity stack 12. In each such embodiment, the air-filter assembly 10 is lip-locked to the velocity stack 12. Such locking is performed manually easily and quickly without use of any tools such that less time, money, and effort are necessary to assemble the air-filter assembly 10 and velocity stack 12 to each other. Such locking also allows the air-filter assembly 10 to be easily, quickly, and safely removed for cleaning and/or replacement of the air-filter assembly 10.

The retaining ring member 46 defines also an exterior side 56, a bottom side 58, and a top side 60. In one embodiment of the air-filter assembly 10 and as shown in FIGS. 3 and 5, respective intersections of adjacent ones of the interior side 50, exterior side 56, bottom side 58, and top side 60 form generally linear corners. In another such embodiment and as shown in FIG. 4, intersection of the exterior side 56 and bottom side 58 forms a generally arcuate corner. However, those having ordinary skill in the related art should appreciate that intersection of the exterior side 56 and bottom side 58 can form a generally arcuate corner in each of the respective embodiments shown in FIGS. 3 and 5. In another such embodiment and as shown in FIG. 4 as well, intersection of the interior side 50 and top side 60 forms a generally arcuate corner 62. In this latter embodiment, filtered air is allowed to flow over the arcuate corner 62 with maximize efficiency—volume, speed, and/or direction—to provide optimal airflow through the air-filter assembly 10.

It should be appreciated by those having ordinary skill in the related art that the retaining ring member 46 can have any suitable shape, size, and structure and structural relationship with the air-filter member 32. It should be so appreciated also that the interior side 50 of the retaining ring member 46 can define any suitable structure adapted to manually mountingly receive the lip 28 of the velocity stack 12 to easily and quickly lip-lock the air-filter assembly 10 to the velocity stack 12 without use of any tools. It should be so appreciated also that the respective intersections of adjacent ones of the interior side 50, exterior side 56, bottom side 58, and top side 60 of the retaining ring member 46 can form a corner of any suitable shape such that filtered air is allowed to flow over the corner with maximize efficiency to provide optimal airflow through the air-filter assembly 10.

Each of the air-filter member 32 and retaining ring member 46 defines a maximum inner diameter and a maximum outer diameter. As shown in FIGS. 3 through 5, the maximum inner diameter of the air-filter member 32 is generally greater than the maximum inner diameter of the retaining ring member 46, and the maximum outer diameter of the air-filter member 32 is generally equal to or less than the maximum outer diameter of the retaining ring member 46. Consequently, the retaining ring member 46 is generally thicker than the air-filter member 32, and no portion of the air-filter member 32 extends beyond the outermost portion of the retaining ring member 46. As shown in these figures, an interface of the air-filter member 32 and retaining ring member 46 defines a plane "P" extending generally horizontal from the interface, and the maximum inner and outer diameters of the air-filter member 32 generally lie in the plane "P." However, those having ordinary skill in the related art should appreciate that each of the air-filter member 32 and retaining ring member 46 can define any suitable maximum inner and outer diameter, depending upon the diameter of the lip 28 of the velocity stack 12 to which the air-filter assembly 10 is lip-locked and/or customized demands of the end-user of the air-filter assembly 10.

Each of the air-filter member 32 and retaining ring member 46 defines a maximum height as well. As shown in FIGS. 3 through 5, the maximum height of the air-filter member 32 located at and above the plane "P" is generally greater than the maximum height of the retaining ring member 46. By way of example only and not by way of limitation, the maximum height of a standard retaining ring member 46 may be ⅜" while the maximum height of a standard air-filter member 32 may be ½". In this way, the profile of the air-filter assembly 10 is low. However, those having ordinary skill in the related art should appreciate that each of the air-filter member 32 and retaining ring member 46 can define any suitable height, depending upon, among other things, the amount of filtering surface area desired, the amount desired of vertical space defined between the hood of the automobile and top of the air-filter assembly 10, and/or customized demands of the end-user of the air-filter assembly 10.

Each of the air-inlet end 40, air-discharge end 42, and air filter 44 is a mesh screen and made of a corrosion-resistant material. Preferably, the air-inlet end 40 and air-discharge end 42 are made of stainless steel, and the retaining ring member 46 is made of silicone. In this way, the air-filter assembly 10 is operatively rigid and operatively lasts a longer period of time, and less time, money, and effort are necessary to operatively maintain the air-filter assembly 10. However, those having ordinary skill in the related art should appreciate that each of the air-inlet end 40, air-discharge end 42, air filter 44, and retaining ring member 46 can be made of any suitable material.

In operation of the air-filter assembly 10, the inner open end 30 of the throat section 24 of a velocity stack 12 is mounted to the mounting plate 16 of the carburetor 14. In turn, the air-filter assembly 10 is manually locked to the velocity stack 12. More specifically, the linear (triangular) or arcuate lip 28 of the velocity stack 12 is manually mountingly received in the interior side 50 of the air-filter member 32 of the air-filter assembly 10 to lip-lock the air-filter assembly 10 to the velocity stack 12 without use of any tools. Air located external the air-filter assembly 10 and to be ultimately taken-in by the carburetor flows at a particular rate and in a particular direction into and through the entire surface area of the air-inlet end 40 of the generally dome-shaped air-filter member 32 and then directly and immediately to the air filter 44 of the air-filter member 32, where impurities entrained in the airflow are filtered. The filtered air then flows through the remainder of the air filter 44 directly and immediately to and through the air-discharge end 42 of the air-filter member 32. The filtered air then flows directly and immediately to and through the interior space 48 of the air-filter member 32. In so doing, some of the filtered air flows over the arcuate corner 62 of the interior side 50 of the retaining ring member 46 with maximized efficiency to provide optimal airflow through the air-filter assembly 10. The filtered air then flows directly and immediately to and through the velocity stack 12, then to and through the mounting plate 16 of the carburetor 14, then to the remainder of the carburetor 14, where the filtered air is carbureted. Finally, the carbureted filtered air flows to the engine of the automobile.

As a result of such operation, the amount and kind of impurities ultimately entering the engine is minimized or even prevented; performance of the engine is improved; appearance and proper functioning of the velocity stack 12 is not detracted from; visible attention from the velocity stack 12 is not taken away; a proportionately lower profile of the velocity stack 12 is not required such that the combination of the air-filter assembly 10 and velocity stack 12 can be properly fitted and functional under the hood of the automobile; optimal airflow through the air-filter assembly 10 is provided; periodic oiling of the air-filter assembly is not required; and less vibration and, in turn, noise of the air-filter assembly 10 is created.

Beyond these results, the air-filter assembly 10 operatively does not require any tools to mount the air-filter assembly 10 to the velocity stack 12. Also, the air-filter assembly 10 operatively is not flimsy. And, the air-filter assembly 10 operatively is not corrosive. Furthermore, the air-filter assembly 10 is economical and simple to produce.

The air-filter assembly 10 has been described above in an illustrative manner. It is to be understood that the terminology that has been used above is intended to be in the nature of words of description rather than of limitation. Many modifications and variations of the air-filter assembly 10 are possible in light of the above teachings. Therefore, within the scope of the claims below, the air-filter assembly 10 may be practiced other than as specifically described above.

What is claimed is:

1. An air-filter assembly adapted to be used with a velocity stack of a carburetor of an internal-combustion engine of an automobile, said air-filter assembly comprising:

a generally hollow air-filter member defining an open face, a closed face, and a side connected to and extending between said open and closed faces of said air-filter member, said closed face and side defining an air-inlet end, an air-discharge end disposed opposite said air-inlet end, and an air filter arranged between said air-inlet and air-discharge ends, said air-inlet end adapted to permit air to flow therethrough from exterior said air-filter assembly, said air filter adapted to remove impurities entrained in the airflow and permit the filtered air to flow therethrough, and said air-discharge end adapted to permit the filtered air to flow therethrough into the velocity stack; and a retaining ring member mounted about said open face and at least a portion of said side of said air-filter member and defining an interior side and an interior space of said retaining ring member, wherein said interior side defines a generally jagged indentation with respect to said interior space adapted to manually mountingly receive a lip of an outer open end of the velocity stack to lock said air-filter assembly to the velocity stack.

2. An air-filter assembly as recited in claim 1, wherein each of said air-inlet end, air-discharge end, and air filter is a mesh screen.

3. An air-filter assembly as recited in claim 1, wherein said air-inlet and air-discharge ends are made of a corrosion-resistant material.

4. An air-filter assembly as recited in claim 3, wherein said air-inlet and air-discharge ends are made of stainless steel.

5. An air-filter assembly as recited in claim 1, wherein said retaining ring member is made of silicone.

6. An air-filter assembly as recited in claim 1, wherein said retaining ring member is integrally mounted about said side and open face of said air-filter member.

7. An air-filter assembly as recited in claim 1, wherein said air-filter member is generally circular and cross-sectionally dome-shaped.

8. An air-filter assembly as recited in claim 7, wherein said air-filter member defines an interior space thereof, said side of said air-filter member being generally concave with respect to said interior space.

9. An air-filter assembly as recited in claim 1, wherein said retaining ring member defines an exterior side, an interior side, a bottom side, and a top side, respective intersections of adjacent ones of said sides forming generally linear corners.

10. An air-filter assembly as recited in claim 1, wherein said retaining ring member defines an exterior side, an interior side, a top side, and a bottom side, intersection of said exterior and bottom sides forming a generally arcuate corner.

11. An air-filter assembly as recited in claim 1, wherein each of said air-filter and retaining ring members defines a maximum inner diameter, said maximum inner diameter of said air-filter member being generally greater than said maximum inner diameter of said retaining ring member.

12. An air-filter assembly as recited in claim 1, wherein an interface of said air-filter and retaining ring members defines a plane extending generally horizontal therefrom, each of said filter and retaining ring members defining a maximum height and said maximum height of said air-filter member located at and above said plane being generally greater than said maximum height of said retaining ring member.

13. An air-filter assembly adapted to be used with a velocity stack of a carburetor of an internal-combustion engine of an automobile, said air-filter assembly comprising:

a generally hollow air-filter member defining an open face, a closed face, and a side connected to and extending between said open and closed faces of said air-filter member, said closed face and side defining an air-inlet end, an air-discharge end disposed opposite said air-inlet end, and an air filter arranged between said air-inlet and air-discharge ends, said air-inlet end adapted to permit air to flow therethrough from exterior said air-filter assembly, said air filter adapted to remove impurities entrained in the airflow and permit the filtered air to flow therethrough, and said air-discharge end adapted to permit the filtered air to flow therethrough into the velocity stack; and a retaining ring member mounted about said open face and at least a portion of said side of said air-filter member, adapted to be manually mounted about a lip of an outer open end of the velocity stack to lock said air-filter assembly to the velocity stack, and defining an exterior side, an interior side, a top side, and a bottom side of said retaining ring member, wherein intersection of said interior and top sides with each other forms a generally arcuate corner.

14. An air-filter assembly adapted to be used with a velocity stack of a carburetor of an internal-combustion engine of an automobile, said air-filter assembly comprising:

a generally hollow air-filter member defining an open face, a closed face, and a side connected to and extending between said open and closed faces of said air-filter member, said closed face and side defining an air-inlet end, an air-discharge end disposed opposite said air-inlet end, and an air filter arranged between said air-inlet and air-discharge ends, said air-inlet end adapted to permit air to flow therethrough from exterior said air-filter assembly, said air filter adapted to remove impurities entrained in the airflow and permit the filtered air to flow therethrough, and said air-discharge end adapted to permit the filtered air to flow therethrough into the velocity stack; and a retaining ring member mounted about said open face and at least a portion of said side of said air-filter member and defining an interior side and an interior space of said retaining ring member, wherein said interior side is generally concave with respect to said interior space and adapted to manually mountingly receive a lip of an outer open end of the velocity stack to lock said air-filter assembly to the velocity stack.

* * * * *